United States Patent

Faley et al.

[15] 3,635,236
[45] Jan. 18, 1972

[54] FLUIDIC DEVICE HAVING VISIBLE IONIZABLE FLUID FLOW

[72] Inventors: Eric Lake Faley, Buffalo Grove, Ill.; David Paul Riewe, Trenton, N.J.

[73] Assignee: Western Electric Company, Incorporated, New York, N.Y.

[22] Filed: Feb. 26, 1970

[21] Appl. No.: 14,497

[52] U.S. Cl. ............................................. 137/81.5, 137/13
[51] Int. Cl. ................................... F15c 1/00, F15c 4/00
[58] Field of Search ........................... 137/81.5, 13, 559

[56] References Cited

UNITED STATES PATENTS

| | | | |
|---|---|---|---|
| 3,438,384 | 4/1969 | Horvitz | 137/81.5 |
| 3,428,066 | 2/1969 | Herr | 137/81.5 |
| 3,494,369 | 2/1970 | Inoue | 137/81.5 |

*Primary Examiner*—William R. Cline
*Attorney*—W. M. Kain, R. P. Miller and R. C. Winter

[57] ABSTRACT

The operation of a fluidic logic device, or the like, is rendered visible by using an ionizable fluid, such as argon, within the device and applying an electric field across the channels of the device of an intensity sufficient to ionize and render visible the fluid so that the path which the fluid takes through the device may be observed.

3 Claims, 7 Drawing Figures

INVENTORS
E. L. FALEY
D. P. RIEWE
By Bryan W. Sheffield
ATTORNEY

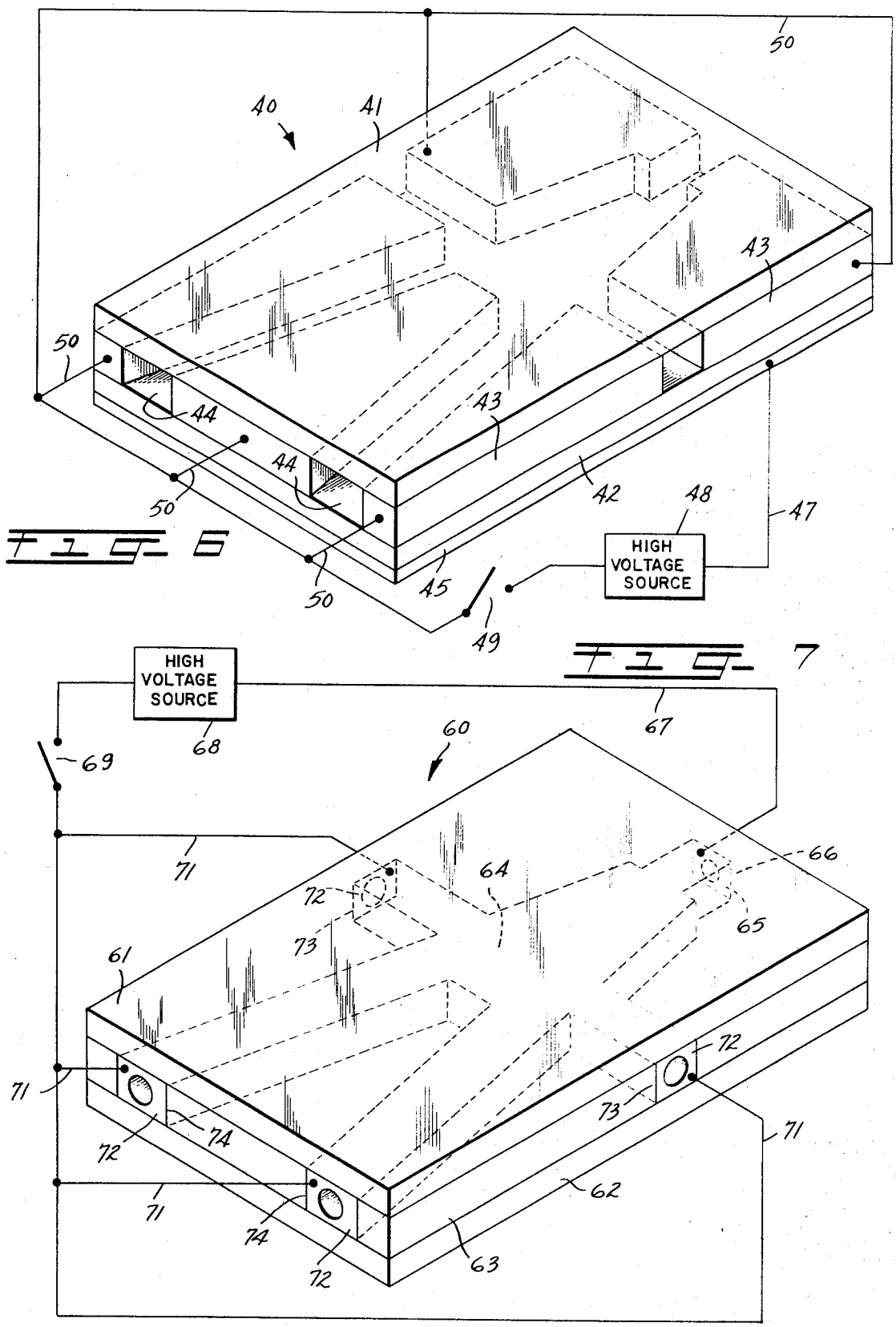

FLUIDIC DEVICE HAVING VISIBLE IONIZABLE FLUID FLOW

BACKGROUND OF THE INVENTION

Broadly speaking, this invention relates to the design and testing of fluidic logic devices. More specifically, in a preferred embodiment, this invention relates to a method of, and apparatus for, rendering the operation of a fluidic logic device visible, so that the dynamic operating characteristics of the device may be observed.

The design and testing of fluidic devices is complicated by the fact that, for the majority of such devices, it is not possible to develop a precise mathematical model which adequately describes the characteristics and operation of the device. Further, for those few devices which can be described by a mathematical model, the resultant equations are exceedingly complex and difficult to solve to any degree of accuracy.

Thus, in the design of prior art fluidic devices an empirical or trial and error approach was often employed. Typically, the design parameters of the desired device were calculated roughly and a prototype model built. The prototype model was then subjected to a series of tests to determine if it performed the desired fluidic function satisfactorily. If, as was usually the case, the prototype failed to meet one or more of the design criteria, the prototype was rebuilt, with appropriate modifications to the internal structure and the testing and modification process reiterated until the desired performance was attained.

Clearly, this is both an expensive and time-consuming procedure. For these reasons, designers of fluidic devices have long sought a method of rendering the dynamic operation of a fluidic device visible to the human eye. The reason why this visual representation is so sought after is that, by actually observing the path that the operating fluid takes through a device, a competent designer can readily determine why a prototype device fails to meet the design objectives and the precisive corrective measures that must be taken to correct the design of the device. In addition, once corrective measures have been taken, visual observation of the fluidic flow in the modified device will quickly verify whether or not the corrective measures that were taken were indeed the correct measures.

When the operating fluid which is used in a device is in a liquid state, colored dyes may be added to the fluid to render the operation of the device visible. This procedure, however, cannot be utilized if the operating fluid is in a gaseous state.

In the prior art, attempts have been made to render the operation of a fluidic device visible by adding cigar smoke, kerosene smoke, misted kerosene and solid particulate material to the operating gas. Such attempts have not proven successful in practice, however, as the material which is added to the gas to render the gas visible tends to accumulate within the device, blocking the input ports, output ports and control ports of the device. Additionally, the materials which are added to the gas tend to alter the characteristics thereof and, hence, the dynamic performance of the device, frustrating the very purpose for which these materials were added to the gas.

The problem then is to find methods and apparatus for rendering the operation of a fluidic device visible without in any way affecting the dynamic operation of the device or modifying the characteristics of the operating fluid which is utilized therein.

SUMMARY OF THE INVENTION

As a solution to the above problem, this invention comprises, in a preferred embodiment, a method of rendering the operation of a fluidic logic device visible by first continuously flowing a fluid through the device which, when ionized, produces a visible glow and second, applying an electric field to the device to ionize the fluid and thereby render the operation of the device visible.

One illustrative apparatus for practicing the above method comprises an electrically nonconducting body having at least one channel formed therein for receiving a continuous flow of ionizable fluid and means, connected to the body, for applying an electric field across the body of an intensity sufficient to ionize the fluid and render the fluid flow in the device visible to an observer.

In some embodiments of the invention, the electric field is applied transverse to the direction of flow of the fluid. In another embodiment, the field is applied coincident with the direction of flow of the fluid.

DETAILED DESCRIPTION

Figure 1:
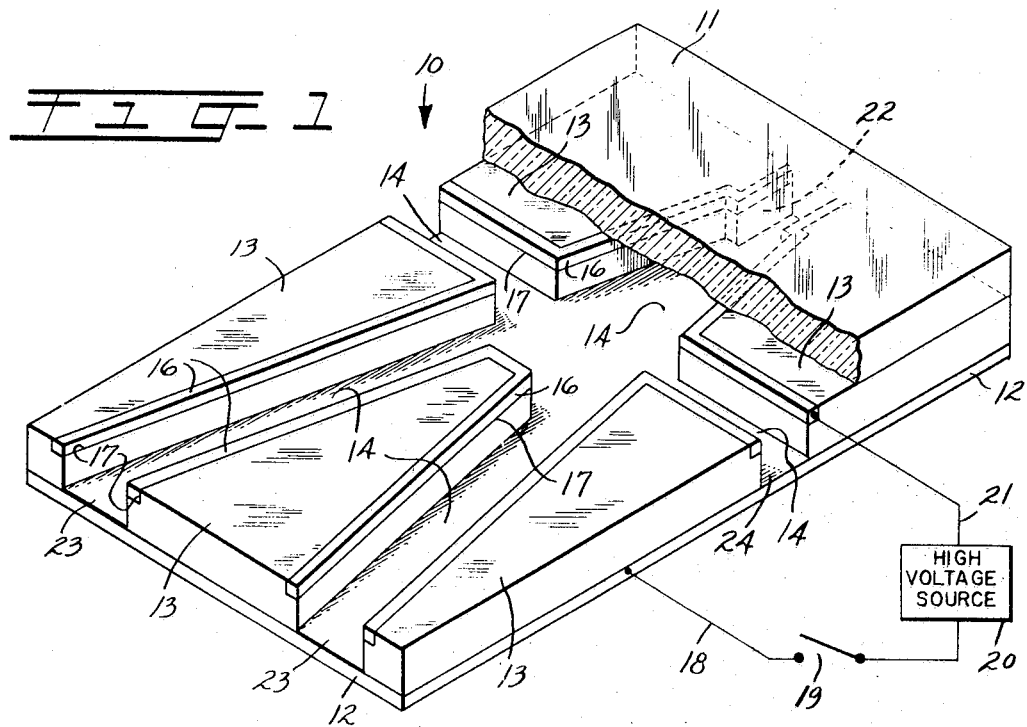

Referring now to FIG. 1, fluidic logic device 10 comprises a flat, rectangular plate of transparent plastic material 11 and a correspondingly dimensioned metallic plate or electrode 12 positioned parallel to the plane of transparent plate 11. A plurality of electrically nonconducting spacing members 13 are sandwiched between plates 11 and 12. The members 13, together with plates 11 and 12, define a plurality of channels 14 which pass through the body of device 10. The pattern of channels 14 is arranged within device 10 so that the device performs the desired logic function. The configuration shown in FIG. 1 represents a bistable multivibrator. However, it will be appreciated that this particular logic function is chosen solely for illustrative purposes and that the methods and apparatus of this invention are equally applicable to all types of fluidic logic devices, for example, to fluidic oscillators, amplifiers, diodes, And gates, Or gates, and the like. Further, as used in the specification and claims the term "fluidic logic device" is intended to include other fluidic devices which, strictly speaking, do not actually perform a logical function.

One face of each spacing member 13 is secured to metallic plate 12 by means of a suitable adhesive (not shown). The other face of each member 13 is secured to transparent plate 11 by means of a conductive epoxy adhesive 16, for example, a metallic silver epoxy adhesive. The conductive adhesive 16 is advantageously confined within a narrow groove 17 which runs around the inner periphery of each member 13. When the device is viewed from the rear, i.e., through transparent plate 11, the pattern of the conductive epoxy adhesive about each spacing member will outline the pattern of channels 14 in the device 10. A first electrical conductor 18 connects metallic plate 12 to a switch 19, thence to one terminal of a high-voltage source 20. A plurality of second electrical conductors 21 connect the other terminal of high-voltage source 20 to the conductive epoxy material 16 securing each spacing member 13 to transparent plate 11. (For the sake of clarity, however, only one such lead 21 is shown in the drawing.)

In operation, a pressurized source of inert gas, for example, argon, is connected to the input port 22 of device 10. In a well-known manner, the inert gas will flow through the device to one of the two exit ports 23 therein, depending upon which of the two control ports 24 is energized by a jet of gas from the same source of pressurized gas. Switch 19 is then closed to apply potential from high-voltage source 20 to the conducting plate 12 and to the pattern formed by the plurality of conductive epoxy adhesive sections 16. The connection of the potential from source 20 creates a high-intensity electric field across each of the channels 14 in device 10 and, if the magnitude of the potential from source 20 is sufficiently high, the inert gas which is flowing through the channels will become ionized and thereby produce a glow discharge, which discharge may readily be observed, or photographed, through the transparent plastic plate 11. It will be noted that the geometry of this embodiment of the invention dictates that the electric field which is applied across the channels 14 is applied transverse to the direction of flow of the ionizable gas.

Advantageously, device 10 is manufactured several times larger than the actual device to be fabricated will ultimately be. However, if all the dimensions of the prototype device 10 are properly scaled, the operation of the prototype device will correspond exactly to the operation of the actual device, when the actual device is ultimately fabricated.

One embodiment of the invention actually built and tested measured approximately 2 inches wide by 3 inches long and the channels which ran through the device measured approximately one-sixteenth inch wide at the narrowest point and varied in depth from approximately one thirty-second inch to three thirty-seconds inch. The fluid employed within the device was pure argon supplied at a pressure of from 5 to 60 p.s.i. and at a flow rate of from 10 to 40 cu. ft./hr. The potential of the high-voltage source was approximately 25 kv. and the ionized argon glowed with sufficient intensity to be easily observed by the human eye in a darkened room. An exposure time of approximately 17 seconds was required to produce a satisfactory photographic record of the glow using high-speed film (ASA 1,000).

Figure 2:
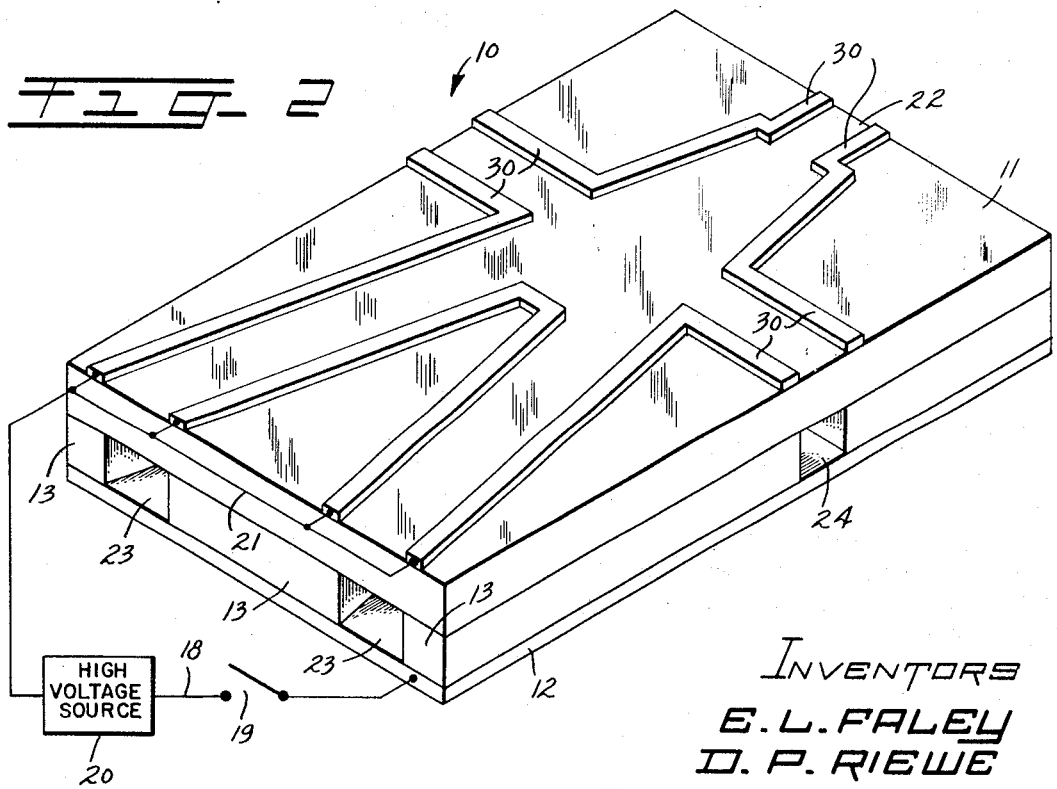

FIG. 2 illustrates an alternative embodiment of the invention. As shown therein, a conductive metallic pattern 30 is laid down upon the upper surface of electrically nonconducting transparent plate 11 and is connected, via the plurality of electrical conductors 21 to high-voltage source 20. Pattern 30 corresponds in function to the pattern of conductive epoxy adhesive 16 depicted in the embodiment of the invention described in connection with FIG. 1 and similarly outlines the pattern of channels 14 in device 10. The operation of the apparatus illustrated in FIG. 2 is entirely analogous to the apparatus illustrated in FIG. 1, however, because the electric field must now be applied *through* electrically nonconducting plastic plate 11, it is necessary to increase the potential of supply 20 to compensate for the increase in path length which the electric field must traverse. This slight disadvantage is, however, more than offset by the fact that the conductive pattern 30 need not exactly follow the pattern of channels 14 through the device. This embodiment of the invention is thus somewhat more flexible in that if it is desired to emphasize a particular portion of the device, only part of conductive pattern 30 need be energized.

Figure 3:
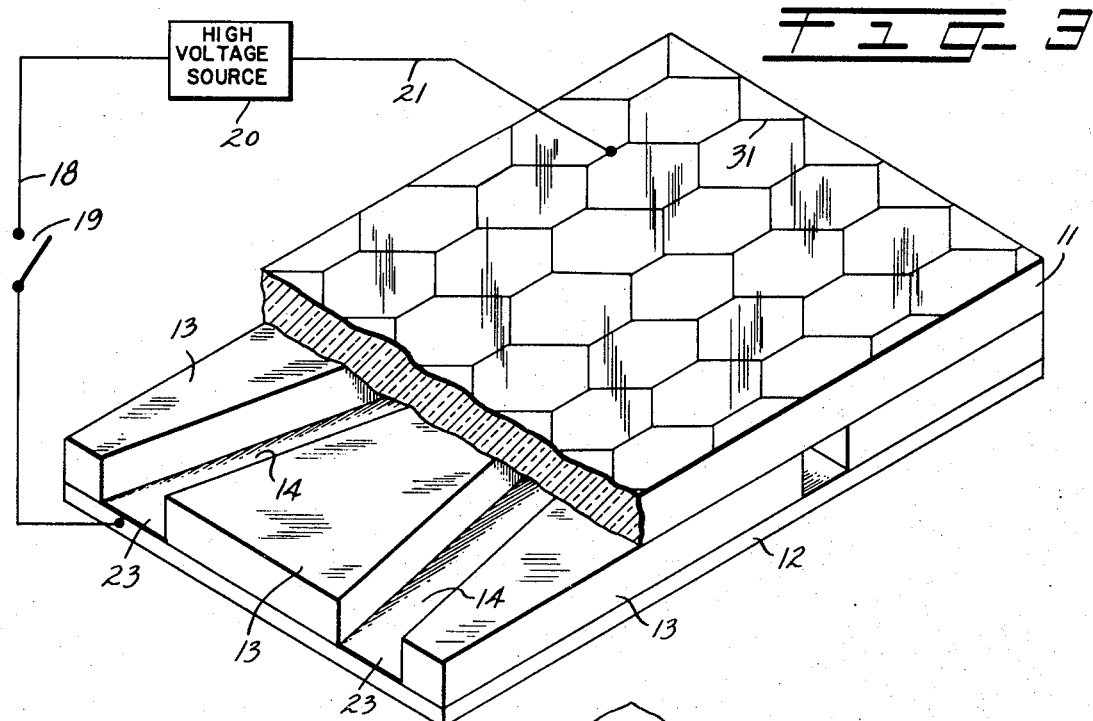

FIG. 3 illustrates yet another embodiment of the invention. In this embodiment, the outer surface of transparent plate 11 is overlaid with an electrically conductive wire screen 31. No attempt is made to align screen 31 with the pattern of channels 14 in the device. Thus, the potential of source 20 must be increased above the potential which is required for the previously described embodiments of the invention in order that the necessary electric field strength may be established across the channels 14. Notwithstanding this slight disadvantage, this embodiment of the invention is somewhat more flexible than the two previously discussed embodiments of the invention in that changes may be made to the dimensions and position of spacing elements 13, and hence channels 14, without the necessity of changing the configuration of conductive screen 31. The mesh of screen 31 must, of course, be sufficiently large to permit visual observation through the mesh of the screen of the ionized gas which is passing through the channels.

Figure 4:
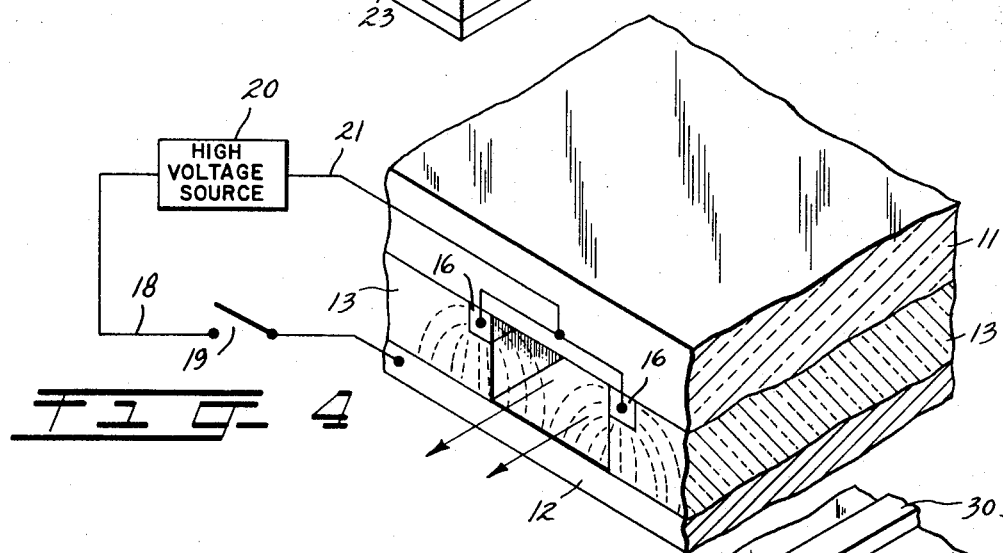
Figure 5:
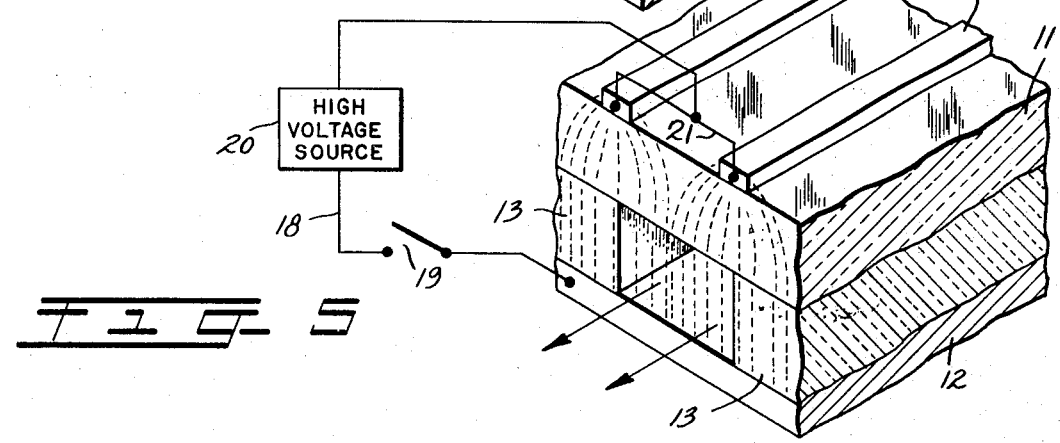

FIGS. 4 and 5 illustrate the shape of the electric field which is established within the channels 14 in the apparatus illustrated in FIG. 1 and FIGS. 2 and 3, respectively. As can be seen, the electric field is generally transverse to the direction of flow of ionized gas. This field orientation tends to minimize any interference which the electric field might cause to the flow of gas through the channels and hence tends to minimize any effect the electric field might have on the overall operation of the device.

FIG. 6 illustrates yet another embodiment of the invention which may be used to advantage when a brighter image of the fluid flow is required. The reduced exposure time which a brighter image permits is particularly advantageous if photographs or slow-speed motion pictures are to be made of the dynamic operation of the device. As shown, the device 40 comprises a transparent, electrically nonconducting first plate 41 and an electrically nonconducting second plate 42 which may also be transparent, if desired. A plurality of electrically conducting, metallic spacing elements 43 are sandwiched between, and adhesively secured to, plates 41 and 42, thereby defining a plurality of channels 44 in the device. An electrically conducting metallic plate, or electrode, 45 is positioned proximate the outer surface of nonconducting plate 42 and is connected, via a first electrical conductor 47 to one terminal of a high-voltage source 48. The other terminal of source 48 is connected, via a switch 49, and a plurality of second electrical conductors 50 to each of the electrically conducting spacing elements 43.

In a manner which is entirely analogous to the operation of the apparatus shown in FIGS. 1 through 3, an ionizable gas, such as argon, is permitted to flow through the device. Switch 49 is then closed to apply potential from source 48 to electrode 45 and each of the spacing elements 43. This results in the application of a high-intensity, electric field across each of the channels 44, ionizing the gas flowing therethrough, and rendering the operation of the device visible through transparent plate 41. Since spacing elements 43 are, in this embodiment of the invention, fabricated from an electrically conducting material, typically a metal, this embodiment of the invention is somewhat more inconvenient to use if the design and layout of the channels in the prototype device are to be changed frequently. In the previously described embodiments of the invention, the spacing elements are electrically nonconductive and typically manufactured from easily machined plastic material. The slight disadvantage of the apparatus shown in FIG. 6 is, however, more than offset by the extremely bright image which may be obtained. This bright image is a result of the higher electric field intensity which may be obtained when the spacing elements themselves form one of the discharge electrodes.

One version of this embodiment actually built and tested measured approximately 2 inches wide by 3 inches long. The spacing elements were milled and cut from 1/16-inch thick aluminum stock and cemented, on one face thereof, to a transparent sheet of Plexiglas one-fourth inch thick. The other face of each spacing element was cemented to a sheet of Teflon 0.02 inch thick. A copper electrode which also measured 2 inches by 3 inches was positioned in loose contact with the Teflon plate and argon gas at a pressure of from 5 to 60 p.s.i. and at a flow rate of from 10 to 40 cu. ft./hr. allowed to flow through the device. The potential of source 48 was only 5 kv. and the ionized argon glowed so brightly that an exposure of only 5 seconds was required with high-speed film (ASA 1,000).

In all the embodiments of the invention discussed so far, the electric field is applied transverse to the flow of the ionizable fluid. FIG. 7 illustrates an alternative arrangement wherein the electric field is applied coincident with the flow of the ionizable fluid. As shown, device 60 comprises a transparent, electrically nonconducting first plate 61 with an electrically, nonconducting second plate 62 positioned parallel thereto. A plurality of electrically nonconducting spacing elements 63 are positioned intermediate, and adhesively secured to, plates 61 and 62 to define a pattern of channels 64 in the device. A first apertured electrode 65 is positioned proximate the input port 66 of device 60 and is connected via a first electrical conductor 67 to one terminal of a high-voltage source 68. The other terminal of source 68 is connected via a switch 69 and a plurality of second electrical conductors 71 to a corresponding plurality of apertured second electrodes 72 positioned proximate the control ports 73 and the exit ports 74 of device 60.

The operation of the apparatus shown in FIG. 7 is also analogous to the operation of all previously described embodiments of the invention and will not be repeated. Suffice it to say that the closure of switch 69 applies potential from source 68 to first electrode 65 and each of the second electrodes 72, thereby establishing a high-intensity electric field within the channels 64 of device 60. Unlike the previously described embodiments of the invention, however, the electric field which is established within the channels of device 60 is applied coincident with the direction of flow of ionizable fluid and not transverse to the flow of said fluid. This occurs as a result of the geometry of the apparatus shown in FIG. 7. Specifically, because the fluid entering the device passes through the aperture in first electrode 65 and gives up its charge when exiting the device through the apertures in second electrodes 72, the field is of necessity established coincident with the flow of the fluid. This embodiment of the invention is somewhat more prone to electrical arcing than the embodiments in which the field is applied transverse to the flow of fluid of the invention. Thus the apparatus shown in FIG. 7 is advantageously used with only the more simple channel configurations and fluidic devices.

In the above-described apparatus, the fluid used was the inert gas argon. This gas is preferred as it is readily ionizable and produces a visible glow when subjected to relatively low electric field intensities. Other inert gases, however, may be substituted for argon, for example, neon, krypton, xenon and helium.

Further, while the invention has been described with reference to fluidic devices of the "building block" type, it will be appreciated that it is equally applicable to other, similar configurations, for example, to devices which are fabricated from a solid block of material by drilling and the like. Indeed, in its broader aspects, the methods and apparatus of this invention may be used to render visible the operation of other types of devices which utilize fluid flow therethrough and are not limited to fluidic control devices of the type which perform functions analogous to electrical and mechanical devices.

It will be apparent that one skilled in the art may make various changes and modifications to the embodiments of the invention disclosed herein without departing from the spirit and scope of the invention.

I claim:

1. A fluidic logic device which comprises:
a transparent, electrically nonconducting first member;
an electrically conducting second member;
at least two electrically nonconducting spacing elements intermediate said first and second members, said elements defining at least one channel in the device for receiving a continuous flow of ionizable fluid therethrough, each of said spacing elements being secured to said nonconducting first member by means of an electrically conducting adhesive; and
circuitry, connected to said electrically conducting second member and to the electrically conducting adhesive securing each of said at least two spacing elements to said second member, for applying an electric field across said at least one channel, transverse to the direction of flow of said ionizable fluid, to ionize and render visible said fluid, whereby the dynamic operating characteristics of said device may be observed.

2. A fluidic logic device, which comprises:
a transparent, electrically nonconducting first member;
an electrically conducting second member;
at least two electrically nonconducting spacing elements, intermediate said first and second members, said elements defining at least one channel in the device for receiving a continuous flow of ionizable fluid therethrough;
an electrically conductive pattern overlaid on the outer surface of said nonconducting first member, said pattern outlining the dimensions of said at least one channel; and
circuitry, connected to said electrically conducting second member and to said electrically conductive pattern, for applying an electric field across said at least one channel, transverse to the direction of flow of said ionizable fluid, to ionize and render visible said fluid, whereby the dynamic operating characteristics of said device may be observed.

3. A fluidic logic device, which comprises:
an electrically conducting first member;
a transparent, electrically nonconducting second member;
a pellucid, metallic screen proximate the outer surface of said transparent second member;
at least two electrically nonconducting spacing elements intermediate said first and second members, said elements defining at least one channel in the device for receiving a continuous flow of ionizable fluid; and
circuitry, connected to said metallic screen and to said electrically conducting first member, for applying an electric field across said at least one channel, transverse to the direction of flow of said fluid, to ionize and render visible through the mesh of said screen the flow of said fluid, whereby the dynamic operating characteristics of said device may be observed.

* * * * *

UNITED STATES PATENT OFFICE
CERTIFICATE OF CORRECTION

Patent No. 3,635,236      Dated      January 18, 1972

Inventor(s)   Eric Lake Faley et al.

It is certified that error appears in the above-identified patent and that said Letters Patent are hereby corrected as shown below:

In the claims, claim 1, column 6, line 4, "second" should read -- first --.

Signed and Sealed this twenty-fifth Day of May 1976

[SEAL]

Attest:

RUTH C. MASON
*Attesting Officer*

C. MARSHALL DANN
*Commissioner of Patents and Trademarks*